US006947799B2

(12) United States Patent
Dittmann

(10) Patent No.: US 6,947,799 B2
(45) Date of Patent: Sep. 20, 2005

(54) METHOD FOR AUTOMATIC PROGRAMMING, AND ASSOCIATED COMPONENTS

(75) Inventor: Werner Dittmann, Albaching (DE)

(73) Assignee: Siemens Aktiengesellschaft, Munich (DE)

( * ) Notice: Subject to any disclaimer, the term of this patent is extended or adjusted under 35 U.S.C. 154(b) by 454 days.

(21) Appl. No.: 10/158,729

(22) Filed: May 30, 2002

(65) Prior Publication Data

US 2003/0009243 A1 Jan. 9, 2003

(30) Foreign Application Priority Data

May 30, 2001 (DE) .......................................... 101 26 239

(51) Int. Cl.[7] ............................................ G06F 19/00
(52) U.S. Cl. ............................. 700/97; 700/95; 717/1; 703/5; 703/2
(58) Field of Search .................... 700/97, 95; 717/1; 703/3, 5, 21

(56) References Cited

U.S. PATENT DOCUMENTS

| | | | | |
|---|---|---|---|---|
| 5,269,014 A | * | 12/1993 | Ogino | 703/22 |
| 5,274,574 A | * | 12/1993 | Tsujido et al. | 703/5 |
| 5,371,851 A | * | 12/1994 | Pieper et al. | 345/501 |
| 5,381,548 A | | 1/1995 | Matsuo | |
| 5,610,972 A | * | 3/1997 | Emery et al. | 455/445 |
| 6,311,149 B1 | * | 10/2001 | Ryan et al. | 703/21 |
| 2001/0020291 A1 | * | 9/2001 | Kudukoli et al. | 717/1 |

OTHER PUBLICATIONS

National Instruments "LabView"—Real time user manual. Apr. 2002 Edition.*
National Instruments "LabView"—Data Acquisition Basics. Jan. 2000 Edition.*
John A. Miller et al.: "JSIM: A Java–Based Simulation And Animation Environment", *IEEE*, 1997, pp. 31–42.
John A. Miller et al.: "Component–Based Simulation Environments: JSIM As A Case Study Using Java Beans", *Proceedings of the 1998 Winter Simulation Conference*, pp. 373–381.
Jasna Kuljis et al.: "A Review Of Web Based Simulation: Whither We Wander?", *Proceedings of the 2000 Winter Simulation Conference*, pp. 1872–1881.
Siegmund, G.: "Technik der Netze" [Network Technology], Hüthig Heidelberg, 4th edition, pp. 597–614.

* cited by examiner

*Primary Examiner*—Leo Picard
*Assistant Examiner*—Michael D. Masinick
(74) *Attorney, Agent, or Firm*—Lawrence A. Greenberg; Werner H. Stemer; Ralph E. Locher

(57) ABSTRACT

The document explains, inter alia, a method in which, for a target system having various functional units, model units are specified to simulate the various functional units. The model units respectively contain compiling functions, so that a method for automatically programming a target system is produced which can easily be changed, serviced and maintained.

13 Claims, 3 Drawing Sheets

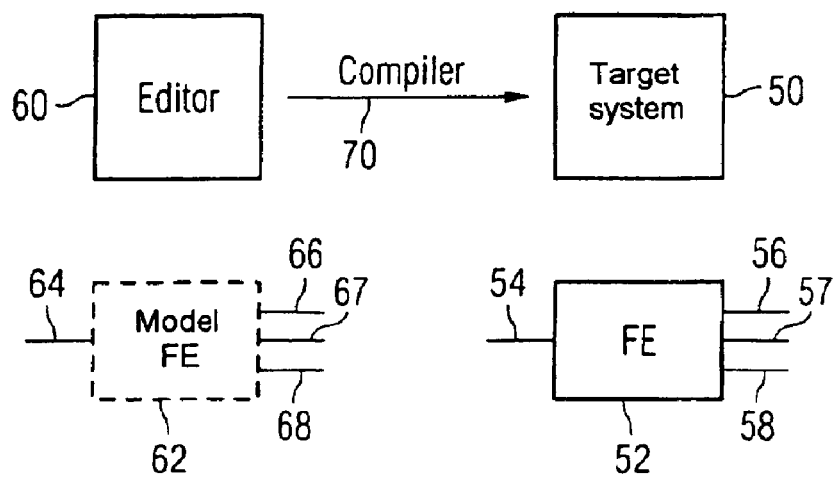
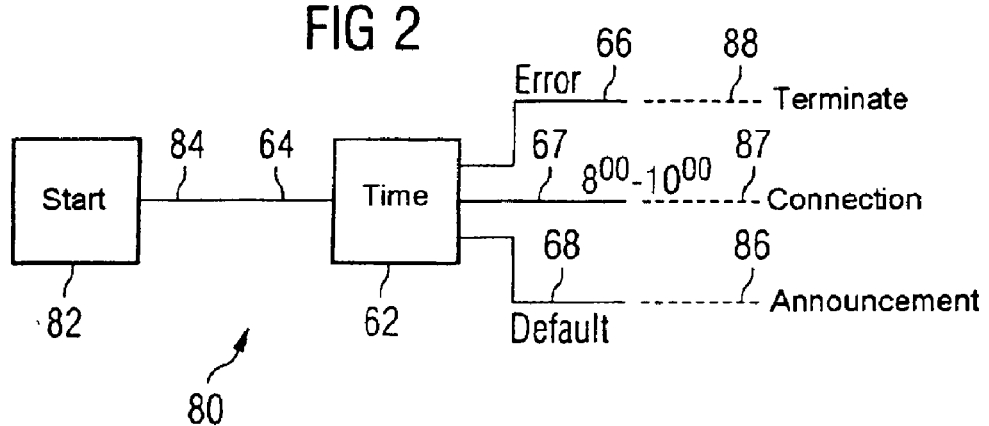

FIG 3A

```
1   package  IN.sibs.Test;                              100
2   import   IN.sibs. Basic.*;
3   import   IN.sibs. Compiler.*;
```

```
4   public class TestSIB extends BasicSIB{
5     private String newOperand = " ";
6     TimeOperand time = new TimeOperand(            102
7             "Time", "time", true);
8     Basic Branch ebr = new BasicBranch("Error");
9     Basic Branch dbr = new BasicBranch("Default");
```

```
10  public TestSIB {
11    super("test","Test");
12    addOperand(time);
13    addBranch(ebr);                                  104
14    addBranch(dbr);
15    putOperandEdit(time);
16    putAssignTo(dbr);}
```

```
17  public String getNewOprand(){
18    return newOperand;                              106
19  }
```

```
20  public void setNewOperand(String lbl){
21    ...                                              108
22  }
```

FIG 3B

```
23  public void compile(SIBEvent seo){                    110
24    int notConnected=lookAhead ();
25    if (not Connected>0{...}
26    CompileArgs compileArgs=
27            (CompileArgs)seo.getRequestArgument();
28    Compiler cmpl=new FSLCompiler(this);
29    cmpl.compile(compileArgs);
30    int numBr=branches.size();                          112
31    for (int i=0; i<num Br; i++){
32      BasicBranch br=(BasicBranch)branches.
33              elementAt(i);
34      SIBListener sl=br.getSIBListener();
35      ·if(sl !=null){
36        seo.setBranch(br);
37        sl.SIBAction(seo);
38  }}}}
```

METHOD FOR AUTOMATIC PROGRAMMING, AND ASSOCIATED COMPONENTS

BACKGROUND OF THE INVENTION

Field of the Invention

The invention relates to a method in which, for a target system having various functional units, model units which respectively simulate the signal inputs and the signal outputs of a functional unit that is to be modeled are specified.

By way of example, such model units are used when developing services for "intelligent networks". In this case, the model units are called service independent building (SIB) units. Intelligent networks are explained, inter alia, in the book titled "Technik der Netze" [Network Technology], Gerd Siegmund, Hüthig Heidelberg, 4th edition, page 597. With the intelligent network (IN) concept, particular services in a telecommunications network that go beyond the pure transmission service and its supplementary service features are concentrated at "intelligent network nodes". Examples of IN services are services with the identification numbers 0800, 0900 or 0130, etc. Service development is explained in more detail in section 6.4.5 of the book by Gerd Siegmund.

In principle, the following phases can be distinguished: a definition of the new service, a stipulation and testing of a service execution, a production of execution path software programs, and a documentation of a service.

When developing new services, already known and stipulated SIB units are used again as far as possible.

When a service is complete, the logical execution of the newly defined service can also be tested immediately from the service definition program using an appropriate software module. Following positive execution, the program code is then generated. The program code is loaded, together with the associated data, into a service control point (SCP) computer and/or a service management point (SMP) computer. The SCP computer and SMP computer are parts of the intelligent telecommunications network.

To date, the program code is produced by a software module that is independent of the model units. However, because the service definition programs have been specifically tailored to particular applications to date, a separate software module for compiling is not regarded as a drawback. The reason for this is that, in the event of changes or additions, the service definition program needs to be changed considerably; in particular, new graphical elements which allow the service to be edited using a graphics program need to be stipulated, for example. Changes in the compiling program are less complex as compared with the changes to the service definition program.

There are also other applications in which the procedure is similar:

a) when programming control systems, e.g. the control system Siematic from Siemens AG;

b) when configuring and optimizing program flowcharts; or c) when configuring electrical circuits or electronic circuits using commercially available computer aided design (CAD) programs.

SUMMARY OF THE INVENTION

It is accordingly an object of the invention to provide a method for automatic programming, and associated components that overcome the above-mentioned disadvantages of the prior art methods and devices of this general type, which, particularly in the case of additions or changes to individual model units, can be adjusted easily and with few programming steps. It is also an aim to specify an associated program, an associated data medium and an associated data processing installation.

With the foregoing and other objects in view there is provided, in accordance with the invention, a method for automatic programming. The method includes specifying model units simulating signal inputs and signal outputs of functional units of a target system, the model units modeling the functional units. During the step of specifying the model units, programming stipulations are taken into account which allow an editing function to determine, at a time of execution, the signal inputs and the signal outputs which a model unit has. The model units are linked to form an overall model by associating the signal outputs with the signal inputs using the editing function. The model units are each respectively provided with an automatic programming function that, owing to an incorporation of the model unit into the overall model, produces program commands for a continued processing of the overall model with another program or for controlling the target system containing the functional units.

The invention is based on the consideration that, for simple editing when the model units are specified, programming stipulations need to be taken into account which allow the editing function to determine, at the time of execution, the signal inputs and signal outputs which a model unit has. With respect to the editing, the model units are thus program units that are already separate from one another. If the individual model units are allocated the portions of the programming function, e.g. of the compiling program, which relate to them, then the method for automatic programming is considerably simplified. In particular, changes in the programming functions are limited to the model units that are to be changed. The commands for executing the programming function are directly associated with the model units, so that allocation processes are not required for changes.

For this reason, in the case of the inventive method, the model units respectively contain a dedicated programming function that, owing to the incorporation of the model unit into the overall model, produces program commands for the continued processing of the overall model with another program or for controlling a target system containing the functional units. In this case, simply storing the overall model is not regarded as producing programming commands for another program.

An example of a programming pattern in the programming language JAVA is the language description for a method for receiving an event message:

void  <eventOccurenceMethodName> (<EventObjektType> evt);

Observing the programming pattern ensures that a source code line programmed on the basis of the programming pattern is evaluated correctly.

In one development of the inventive method, a model unit automatically prompts the calling of a programming function in another model unit, whose signal input has been associated with the signal output of the model unit prompting the call. The model units prompt the calling of programming functions until all the programming functions of the overall model have been called. This development of the invention sets out from the consideration that the programming stipulations needing to be observed in order to produce the editing function also permit simple calling of the programming functions.

In a subsequent development of the inventive method, the model units simulate functions of the functional unit that is to be modeled. When the model units are specified, programming stipulations are taken into account that allow the editing function to determine, at the time of execution, which parameters have been chosen for simulating the function. To simulate the function, output signals from a functional unit need to be forwarded to a functional unit connected downstream. To this end, there are fundamentally two options, namely transmitting and processing event messages and directly calling methods from another model unit. In the case of one refinement, there is also an event message for activating the programming function, which is sent to a first model unit. When the programming message is processed, the programming function in the first model unit is executed. Programming messages are then sent to the model units connected downstream of the first model unit and likewise execute the respective programming functions therein. In this way, programming messages are forwarded through the entire model. At the end, the entire model has been compiled.

In another development of the inventive method, the functional units are part of a service control point (SCP) computer, part of a call-processing facility, e.g. are part of an exchange, or are part of a telecommunications installation. SCP computers are required, in particular, for producing services in an intelligent telecommunications network.

In a subsequent development of the inventive method, programming patterns prescribed by the programming language JAVA or ActivX are taken into account. The programming patterns of other languages can also be used, however, e.g. that of the programming language Perl. In particular, the programming language JAVA is in widespread use. Graphical functions for implementing the editing function no longer need to be programmed by each manufacturer of specific applications. The manufacturer now limits himself merely to modulating his specific functional units and to compilation.

In a subsequent development, the model units are in the form of "JAVA beans" or "ActivX" control elements. JAVA beans are reusable software components that can be connected to overall models using a graphical development tool. In connection with JAVA beans, reference is made to the book titled "Developing JAVA-Beans", by Robert Englander, O'Reilly, Köln, 1997, for example. Particularly the configuration of automatic programming functions in the individual JAVA beans results in a method that is far superior to the previously used methods for automatic programming. The result of allocating the programming functions to individual JAVA beans is that the programming functions also use the advantages arising as a result of heavy modularization, namely clear, reusable and modular model units which are also easy to service and to maintain.

In a subsequent development of the inventive method, the programming function allows different target systems to be selected. To this end, by way of example, a selection parameter stipulating the target system is transferred to the programming function. On the basis of the value of the selection parameter, program code for an exchange of one or the other type is then produced, for example.

In one development, the automatic programming function is a compiling function that, owing to the incorporation of the model unit into the overall model, produces a portion of a program specific to the target system for the purpose of controlling the functional unit simulated by the model unit. In this context, compilation refers to a full translation of source code is executed.

In one alternative development, the automatic programming function produces commands for a simulation program used to process the overall model subsequently.

In another alternative, the automatic programming function produces commands for a program for the purpose of improved graphical display of the overall model as compared with the display using the editing function. One example of application is programs for displaying and checking the execution times for program flowcharts.

The invention also relates to a program and to a data medium (i.e. a computer-readable medium) with a program. The program contains a command sequence which, when executed by a processor, carries out the inventive method or one of its developments. In the case of one refinement, the program is a JAVA bean. The data medium is a volatile or nonvolatile storage unit, such as a diskette, a CD (compact disc), ROM, a hard disk, a random access memory, an EEPROM, Flash memories, etc. In addition, a data processing installation is protected by such a program. The data processing installation contains a processor and a storage unit. The aforementioned technical actions likewise apply to the program, the data medium and the data processing installation.

Other features which are considered as characteristic for the invention are set forth in the appended claims.

Although the invention is illustrated and described herein as embodied in a method for automatic programming, and associated components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of functional units required for automatically programming a target system according to the invention;

FIG. 2 is a block diagram of an overall model which has been produced by linking a start model unit and a time-control model unit; and FIGS. 3A and 3B show the JAVA source code for the time-control model unit.

DESCRIPTION OF THE PREFERRED EMBODIMENTS

Referring now to the figures of the drawing in detail and first, particularly, to FIG. 1 thereof, there is shown a target system 50, e.g. a SCP computer, which is part of an intelligent network (IN), which is not shown. The target system 50 provides its functions using functional units, of which a functional unit 52 is shown in FIG. 1. The functions of the functional units 52 are provided using a program or using electronic circuits, which do not contain a program. By way of example, the functional unit 52 is a time-control functional unit that ascertains a system time and compares it with prescribed time values. The functional unit 52 has a signal input 54 and three signal outputs 56, 57 and 58. In the target system 50, the functional unit 52 is implemented using a time-control circuit or using a software program, for example. The exact operation of the functional unit 52 is explained below in connection with a model unit 62 for the functional unit 52.

An editor program 60 can be used to produce application programs for the target system 50. In the exemplary embodiment, the editor program 60 is a graphical editor that can be used to link model units simulating the functional units 52. By way of example, a time-control model unit 62 simulates the functions of the time-control functional unit 52. The time-control model unit 62 is displayed to an operator on a screen as a rectangle adjoined by an input line 64 for simulating the signal input 54 and three output lines 66 to 68 for the purpose of simulating signal outputs 56 to 58. A computer mouse can be used to position the model unit 62 on the screen and to link it to other model units to form an overall model for an application. Next, the overall model is tested, which involves calling functions of the model unit which simulate the operation of the functional unit 52. On the basis of the test results, the overall model is changed if appropriate. If the test results are satisfactory, then a compiling function 70 is used to produce a program that can be executed by a processor in the target system 50 from the overall model. The compiling function 70 is explained in more detail below with reference to FIGS. 3A and 3B.

FIG. 2 shows a portion of an overall model 80 that contains a start model unit 82 and the time-control model unit 62. The start model unit 82 has an output line 84 that leads to the input line 64 of the time-control model unit 62. If the system time cannot be ascertained, then an error signal is output on the signal output 56, or on the output line 66 in the overall model 80, to a subsequent functional unit 88, which is illustrated by a dashed line. By way of example, it is output to a functional unit that rejects a call arriving on a subscriber terminal in a telecommunications network.

If the ascertained system time is between 8 o'clock am and 10 o'clock am, for example, then the output line 67 is used to prompt a subsequent model unit 87 to forward the incoming call to a particular other terminal. If, on the other hand, the ascertained system time is outside the time prescribed by the operand, i.e. before 8 o'clock am or after 10 o'clock am in the example, then the output line 68 is used to actuate a unit 86 for the purpose of playing an announcement.

FIGS. 3A and 3B show the JAVA source code for the time-control model unit 62. The left-hand edge indicates the numbers of the source code lines 1 to 38, which are simultaneously reference numerals.

The source code lines 1 to 38 are explained in detail below in order. A semicolon at the end of a line means that a program instruction is at an end. The program instructions are written in the programming language JAVA from Sun Microsystems.

A first program section 100 contains the following source code lines:

| 1 | package IN.sibs.Test; |
| 2 | import IN.sibs.Basic.*; |
| 3 | import IN.sibs.Compiler.*; |

The source code line 1 stipulates that the JAVA bean unit stipulated in source code lines 1 to 38 belongs to a package called "IN.sibs.Test". In this case, "IN" is the abbreviation for "intelligent network", and "sibs" is the abbreviation for "service independent building blocks".

The source code line 2 stipulates that the package IN.sibs.Test contains all classes stipulated in basic packages starting with the name "IN.sibs.Basic.". The character "*" serves as a wildcard. The basic packages contain the following classes, for example, and as described below.

The class BasicSIB for stipulating the properties which are the same for all function blocks, for example the property that every output of a function block can be connected to only one subsequent function block.

The classes BasicBranch and BasicBoundedBranch, which describe the properties of the branches between the function blocks, e.g. the names of the branches or the terminal point of a branch. In this context, "Bounded" means that additional branches are respectively associated with one operand.

The class BasicSIBOperand, which defines the basic properties of an operand for a function block, e.g. its name.

The classes SIBEvent and SIBListener, which stipulate the type of event handling between the function blocks. These two classes are used by customary JAVA bean development environments. Similar classes are used for all JAVA bean applications, see the aforementioned book titled "Developing JAVA-Beans", section 2, "Events", for example.

The classes BasicSIBEditor, SelectInfo and SelectInfoEditor, which make available functions which are used by the development environment to edit the bean properties. These classes are required only if element beans with unusual properties are stipulated.

The class BasicVJ, which stores specific auxiliary functions required by the commercially available development tool "JAVA Studio". This class can also be produced automatically by the development tool "JAVA Studio" on account of the bean structures produced for the application.

In the explanation of FIGS. 3A and 3B, the properties of the classes are discussed only to the extent that the properties are required for understanding the exemplary embodiment.

The source code line 3 stipulates that all classes contained in a package called "IN.sibs.Compiler" belong to the package "IN.sibs.Test". The character "*" again serves as a wildcard. The package called "IN.sibs.Compiler" contains classes that implement the portions of the compiler that are independent of the individual function blocks, for example classes for prescribing compiler arguments and classes for recording the structure of a JAVA bean. The properties of the compiler classes are explained with reference to FIGS. 3A and 3B only to the extent that they are required for understanding the exemplary embodiment.

A subsequent program section 102 contains the following source code lines:

| 4 | public class TestSIB extends BasicSIB{ |
| 5 | private String newOperand = ""; |
| 6 | TimeOperand time = new TimeOperand( |
| 7 | "Time", "time", true) ; |
| 8 | BasicBranch ebr = new BasicBranch("Error") ; |
| 9 | BasicBranch dbr = new BasicBranch ("Default") ; |

The instructions specified in the source code line 4 stipulate that a new class "TestSIB" is stipulated subsequently. The class "TestSIB" is a public class, i.e. a class that can also be used by other classes, see instruction "public".

The class "TestSIB" extends the class "BasicSIB" stipulated in the package "IN.sibs.Basic", see instruction "extends".

The class BasicSIB contains "methods" required for stipulating the properties of a model unit. The methods or functions are explained to the extent that they are required for understanding the exemplary embodiment.

The source code line 5 stipulates that the class "TestSIB" contains a character string variable called "newOperand". The variable "newOperand" is initially assigned an empty character string " ". In addition, the variable "newOperand" is available only within the class "TestSIB", see the instruction "private". The variable "newOperand" is also referred to as being encapsulated.

The source code lines 6 and 7 reserve memory space for a variable "time", which has the structure stipulated in the class "TimeOperand". The class "TimeOperand", for its part, originates from the basic class BasicSIBOperand. When the variable "time" is produced, three parameters "Time", "time" and "true" need to be specified. "Time" denotes the name of the output that is allocated to the new operand. "time" specifies the operand type. "true" means that the output needs to be connected to the input of a subsequent functional unit or model unit.

The source code line 8 contains an instruction to start or create a branch variable ebr (error branch). The name specified for this branch is the name "Error".

The source code line 9 produces a variable dbr (default branch), which likewise serves for implementing a branch structure. The name specified for this branch is "Default".

Implicitly, it is assumed that all model units have at least one input. Explicit specification of an input branch is thus not necessary.

A program section 104 stipulates the "constructor" for the time-control model unit 62. The instructions specified in program section 104 are executed when the model unit 62 is pulled into a work area of the editing program using the editor program and using a computer mouse. This procedure is also known as a drag-and-drop procedure.

The program section 104 contains the following source code lines:

```
10    public TestSIB{
11    super("test", "Test") ;
12    addOperand(time) ;
13    addBranch(ebr) ;
14    addBranch(dbr) ;
15    putOperandEdit(time) ;
16    putAssignTo(dbr) ; }
```

The constructor for the class "TestSIB" is public, see keyword "public", and can thus also be called from other classes, particularly from the classes of the editor. The instructions in the source code line 11 are used to call the constructor for the superordinate class, i.e. the constructor for the class "BasicSIB". The arguments transferred are the two parameters "test" and "Test". "test" is an internal identifier. "Test" is an identifier indicated by the editing program 60.

The source code line 12 calls the method "addOperand", that the class "TestSIB" has inherited from the class "BasicSIB". The effect of specifying the parameter "time" is that the model unit 62 has a time operand added to it. When the instruction in accordance with source code line 12 is executed, the model unit 62 has the output line 67 added to it.

The instruction in the source code line 13 is used to call a method "addBranch", which the class "TestSIB" has inherited from the class "BasicSIB". The parameter specified is the name "ebr", which denotes the variable stipulated in the program line 8. When the instruction in accordance with source code line 13 is executed, the model unit 62 has the output line 66 added to it.

The instruction in the source code line 14 is used to call the method "addBranch" again, but using a different parameter, namely the variable dbr. When the instructions in accordance with the source code line 14 are executed, the model unit 62 has the output line 68 added to it.

The effect of the instruction in the source code line 15 is that the operand "time" can be edited using the editing program 60. Thus, a time period in which a particular action then needs to be executed can be prescribed during simulation.

The instruction "putAssignTo" in the source code line 16 is used to select the branch associated with the variable dbr, i.e. the branch called "Default", so that this branch can be processed immediately after clicking on the character for the model unit 62. A right-hand curly bracket specifies the end of the constructor in the source text line 16.

Program sections 106 and 108 stipulate two methods which are required only if the model unit supports a variable number of branches. The additional branches are always linked to an operand. The program section 106 contains the following source text lines:

```
17    public String getNewOperand() {
18    return newOperand;
19    }
```

The source code line 17 is used to stipulate that the method "getNewOperand" is public and returns a character string variable as the result. When the method "getNewOperand" is called, no parameters need to be specified. The source code line 18 specifies that, when the method "getNewOperand" is called, the argument returned is the value of the variable "newOperand". In the source code line 19, a right-hand curly bracket specifies that the definition of the method "getNewOperand" is complete.

A program section 108 contains the instructions for stipulating a method "setNewOperand" which can be used to add a new operand to the model unit 62.

```
20    public void setNewOperand(String lbl) {
21        . . .
22    }
```

The argument needing to be transferred is a character string whose value is assigned to a character string variable lbl (label). In the source code line 21, dots indicate instructions that are executed when the method "setNewOperand" is executed. The instructions are not required for understanding the exemplary embodiment, and are therefore not explained in more detail. In the source code line 22, a right-hand curly bracket specifies that the definition of the method "setNewOperand" has ended.

A program section 110 contains instructions that are executed for the purpose of compilation:

```
23    public void compile(SIBEvent seo){
24      int notConnected = lookAhead() ;
25      if(notConnected > 0{. . .}
26      CompileArgs compileArgs =
27          (CompileArgs)seo.getRequestArgument() ;
28      Compile cmpl = new FSLCompiler(this)
29      cmpl.compile(compileArgs) ;
```

The source code line 23 reveals that the method "compile" in the model unit 62 is public, see keyword "public", and does not return a parameter, see keyword "void". Calling of the method "compile" is prompted by an event message to this method. The event message is stored in a local variable "seo" (sib event origin) when called.

The instructions in the source code lines 24 and 25 are used to check whether all the output branches of the model unit 62 are connected to subsequent model units. If not all of the output branches of the model unit 62 are connected to subsequent model units, then a display unit outputs an error message which specifies how many branches are not connected.

The instructions in the source code lines 26 and 27 are used to read compiler arguments from the event message "seo" and to allocate them to the local variable "compileArgs".

The instruction in the source code line 28 is used to produce a variable called "cmpl" of the type Compiler. The compiler specified is an FSL compiler, i.e. a compiler for flexible service logic, which is used in IN applications specific to Siemens. The argument specified is "this", i.e. the source code of the model unit 62.

The instruction in the source code line 29 is used to prompt compilation of the model unit 62 with the previously extracted compiler arguments. The compiler records the structure of the model unit 62 by parsing and analyzing the source code lines 1 to 38. In particular, the compiler is able to use the source code lines 6 to 9 to record the number of output branches. On the basis of this structure, commands in the programming language FSL are produced which can be executed directly by the target system 10. The file to which these commands are to be written is specified in the compiler arguments.

Execution of the method compile in the model unit 62 is prompted by the start model unit 80. This is because the start model unit 80 sends a compiling message to the time-control model unit 62. When the compiling message is processed, the compile function is executed.

When the model unit 62 has been compiled, the model unit 62 prompts the sending of compiling messages to the model units that succeed it. The instructions required for this are shown in a program section 112. The program section 112 contains the following source code lines:

```
30    int numBr = branches.size() ;
31    for(Int i = 0; i < numBr; i++) {
32      BasicBranch br = (BasicBranch)branches.elementAt(i) ;
34      SIBListener sl = br.getSIBListener() ;
35      If(sl != 0{
36          seo:setBranch(br) ;
37          sl.SIBAction(seo) ;
38      }}}}
```

The instruction in the source code line 30 is used to ascertain how many output branches the model unit 62 has.

In the exemplary embodiment, the model unit 62 has three output branches 66 to 68. The variable "numBr" is thus assigned the value 3.

In the source code line 31, a "program loop" starts which is also called a for loop and can be used to send compiling messages to the model units to which output branches of the model unit 62 lead. For each output branch, the instructions in the source code lines 32 to 37 are executed.

The effect of the instruction in the source code line 32 is that a local variable called "br" and of the type "BasicBranch" is allocated the output branch that is currently to be processed. The instruction in the source code line 34 is used to ascertain the subsequent model unit, i.e. the model unit that receives event messages sent via the output branch in question. The model unit is allocated to a variable sl (SIB listener).

The instruction in the source code line 35 is used to check whether the variable sl has a value which is different than zero. This is the case whenever it has been possible to ascertain a model unit that is connected to the currently processed output branch of the model unit 62. If it has been possible to ascertain such a model unit, the source code lines 36 and 37 are executed.

The instruction in the source code line 36 is used to mark a reference to the currently processed output branch of the model unit 62 in the compiling message. Next, the instruction 37 is used to send a compiling message to the model unit that is connected to the output branch br.

The source code line 38 contains four right-hand curly brackets which, in order from left to right, are associated with the if instruction in the source code line 35, with the for instruction in the source code line 31, with the compile method and with the class "TestSIB".

The JAVA beans for other model units in other exemplary embodiments are programmed in a similar manner to the JAVA bean for the class "TestSIB".

The active start model unit 80 essentially produces only the event message for starting compilation. The Start model unit 80 contains only the class ButtonSIB. This class sends a SIBEvent to the connected model unit. This event message contains a parameter that prompts the calling of the output method, i.e. the method "compile".

The package "IN.sibs.Test" defines still further classes undertaking auxiliary functions during the test, namely the following classes are now discribed.

The class TimeOperand, which describes the appearance of a time operand to a model unit.

The class EditTimeOperand, which defines auxiliary functions for inputting the data for the time operand.

The classes TestSIBBeanInfo and TestSIBEditor, which provide the development tools with additional information relating to the interfaces of the JAVA bean and make the editing functions available. Both classes are required only if JAVA beans with unusual properties need to be used.

The classes VJTestSIB, VJTestSIBCustomizer and VJTestSIBVJComponentInfo, which contain specific auxiliary functions required by the development tool "JAVA Studio". These three classes can also be produced automatically by "JAVA Studio" on account of the bean structures. These classes are not required for other development tools.

The classes VJButtonSIB and VJButtonSIBVJComponentInfos with specific auxiliary functions required by the development tool "JAVA Studio". These classes were produced automatically by "JAVA Studio" on account of the bean structures for the respective application. These classes are not required for other development tools.

I claim:

1. A method for automatic programming, which comprises the steps of:
   specifying model units simulating signal inputs and signal outputs of functional units of a target system, the model units modeling the functional units;
   during the step of specifying the model units, taking into account programming stipulations which allow an editing function to determine, at a time of execution, the signal inputs and the signal outputs which a model unit has;
   linking the model units to form an overall model by associating the signal outputs with the signal inputs using the editing function;
   providing the model units each respectively with an automatic programming function which, owing to an incorporation of the model unit into the overall model, produces program commands for one of a continued processing of the overall model with another program and for controlling the target system containing the functional units; and
   performing the automatic programming function as a compiling function which, owing to an incorporation of the model unit into the overall model, produces a portion of a program specific to the target system for controlling a functional unit simulated by a given model unit.

2. The method according to claim 1, which comprises using a first model unit to automatically prompt a calling of the automatic programming function in a second model unit having a signal input that is associated with a signal output of the first model unit prompting the call, and the first and second model units prompt the calling of the automatic programming functions until all the programming automatic functions have been called.

3. The method according to claim 1, which comprises using the model units to simulate functions of a functional unit which is to be modeled, and when the model units are specified, the programming stipulations are taken into account which allow the editing function to determine, at the time of execution, which parameters have been chosen for simulating a function.

4. The method according to claim 1, which comprises selecting the functional units from the group consisting of parts of a call-processing facility, parts of a service control point computer, parts of an exchange, and parts of a telecommunications installation.

5. The method according to claim 4, which comprises using the functional units to produce functions of a service intelligent network.

6. The method according to claim 1, which comprises taking into account programming patterns prescribed by a programming language JAVA.

7. The method according to claim 1, which comprises taking into account programming patterns prescribed by a programming language ActivX.

8. The method according to claim 6, which comprises forming the model units as JAVA beans.

9. The method according to claim 1, which comprises using the automatic programming function to select different target systems.

10. The method according to claim 1, wherein the automatic programming function produces commands for a simulation program used to process the overall model.

11. The method according to claim 1, wherein the automatic programming function generates commands for a program for improving a graphical display of the overall model as compared with a display using the editing function.

12. A data processing installation, comprising:
    a processor running a program containing a command sequence programmed to:
      specify model units simulating signal inputs and signal outputs of functional units to be modeled for a target system having various ones of the functional units;
      take into account programming stipulations which allow an editing function to determine, at a time of execution, the signal inputs and the signal outputs which a model unit has when the model units are specified;
      link the model units to form an overall model by associating the signal outputs with the signal inputs using the editing function; and
      provide the model units each with an automatic programming function which, owing to an incorporation of the model unit into the overall model, produces program commands for one of a continued processing of the overall model with another program and for controlling the target system containing the functional units, the automatic programming function is a compiling function which, owing to an incorporation of the model unit into the overall model, produces a portion of a program specific to the target system for controlling a functional unit simulated by a given model unit.

13. A computer-readable medium having computer executable instructions for performing a method which comprises the steps of:
   specifying model units simulating signal inputs and signal outputs of functional units to be modeled for a target system having various ones of the functional units;
   taking into account programming stipulations which allow an editing function to determine, at a time of execution, the signal inputs and the signal outputs which a model unit has when the model units are specified;
   linking the model units to form an overall model by associating the signal outputs with the signal inputs using the editing function;
   providing the model units each with an automatic programming function which, owing to an incorporation of the model unit into the overall model, produces program commands for one of a continued processing of the overall model with another program and for controlling the target system containing the functional units; and
   performing the automatic programming function as a compiling function which, owing to an incorporation of the model unit into the overall model, produces a portion of a program specific to the target system for controlling a functional unit simulated by a given model unit.

* * * * *